UNITED STATES PATENT OFFICE.

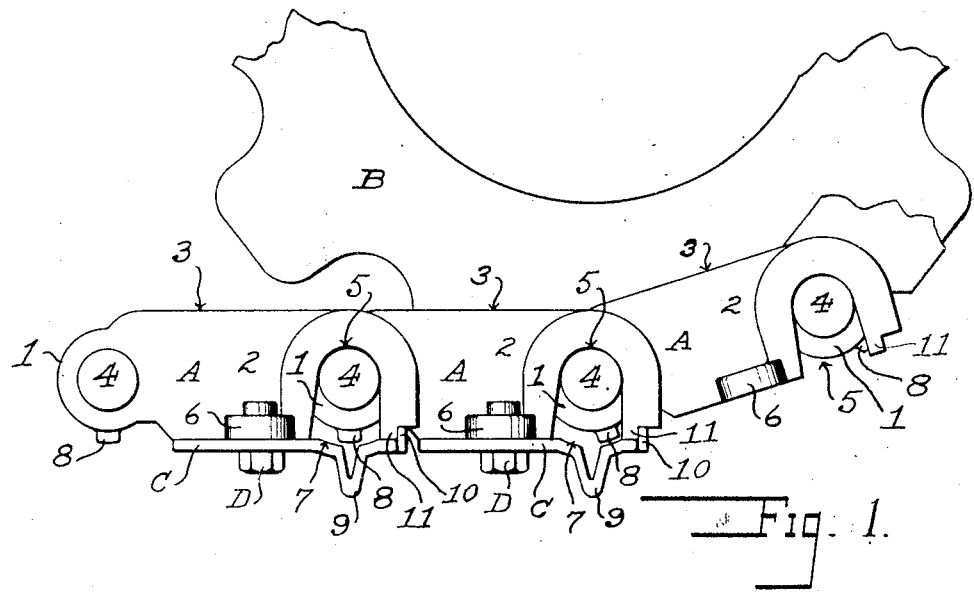
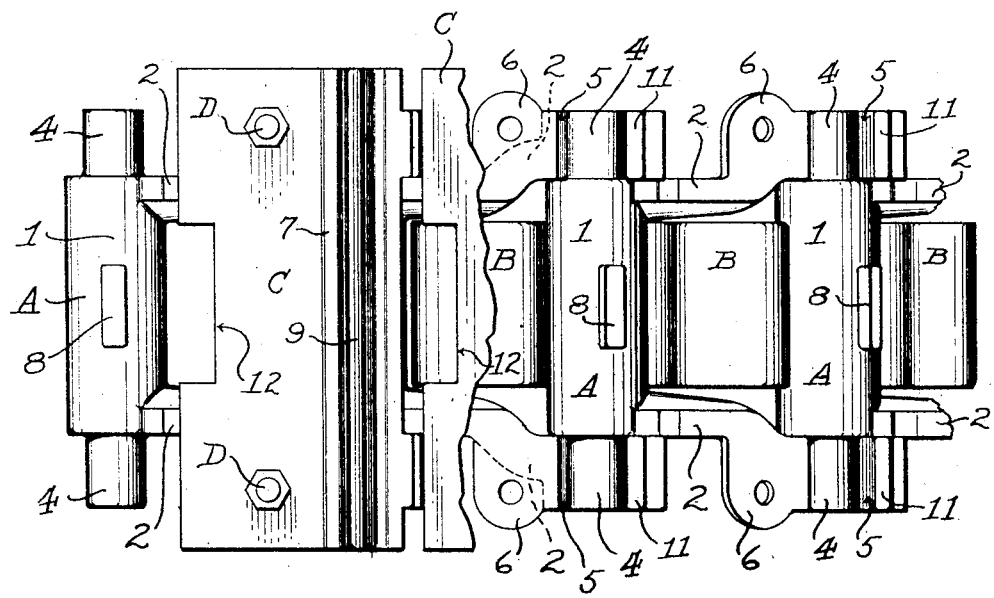

FRANK MOON, OF OAKLAND, CALIFORNIA, ASSIGNOR TO MOON TRACTOR CO., OF SAN FRANCISCO, CALIFORNIA, A CORPORATION OF CALIFORNIA.

TRACTOR TRACK-CHAIN.

1,370,757.

Specification of Letters Patent.

Patented Mar. 8, 1921.

Application filed October 29, 1919. Serial No. 334,302.

*To all whom it may concern:*

Be it known that I, FRANK MOON, a citizen of the United States, residing at Oakland, in the county of Alameda and State of California, have invented certain new and useful Improvements in Tractor Track-Chains, of which the following is a specification.

My invention relates to a track-chain for tractors and other road-running vehicles.

The object of my invention is to provide a track-chain which has the smallest possible number of parts, and which is so constructed that it can be easily and quickly taken apart for replacement or repair. My track chain is therefore simple and cheap to construct, and inexpensive to maintain in proper working order.

With this in view, my invention will now be fully described with reference to the accompanying drawings, wherein, Figure 1 is a side elevation of a portion of my track-chain and a portion of the sprocket engaging it.

Fig. 2 is a bottom view, one shoe being omitted and another broken away to show the link-members above.

Referring more particularly to the drawings, each complete link of my track-chain consists essentially of a rail member A adapted to be engaged by the teeth of a sprocket B, a tread member or shoe C, and means for removably securing said shoe upon said rail member, shown in the drawings as comprising a pair of bolts D.

The rail member A is substantially U-shaped, having a transverse portion 1 adapted to lie between the teeth of the sprocket B, and spaced longitudinally disposed arms 2, the latter being formed with flat upper surfaces 3, Fig. 1, forming the rails upon which the weight-supporting wheels of the vehicle, not shown, may operate. The transverse portion 1 of said rail member A has oppositely disposed laterally projecting studs 4, Figs. 1 and 2, which form the articulations between adjacent links. The arms 2, which diverge toward their ends, are notched as at 5, to fit over and engage the studs 4 of the next link. Ears 6 are formed upon said arms to receive the shoe retaining bolts D.

The shoe C, which, on account of its shape, may be stamped from a flat sheet of metal, is formed with an arcuate portion 7, Fig. 1 positioned in transverse alinement with the notches 5 of the arms 2, and adapted to retain the transverse portion 1 of the next link in position by engaging a raised lug 8, Figs. 1 and 2, formed upon said transverse portion. The shoe is also formed with a traction rib 9 and an upwardly turned end flange 10, Fig. 1, adapted to engage projections 11 formed upon the end portions of the arms 2, to take the tractive effort and relieve the bolts D of shearing strains when the machine is traveling in a forward direction. The rear edge of the shoe C is cut away, as at 12, Fig. 2, to permit the expulsion of sand and dirt by the teeth of the sprocket driving wheel B, which operate between and engage the transverse members 1.

The simplicity of my track-chain will be apparent to anyone versed in the art. The rail member A may be either forged or cast, with the articulating studs 4 integral, and the shoe C may be stamped or die-pressed at one operation. On account of the loose fit of the studs 4 within the notches 5 no machining is necessary, and the integral stud construction obviates the necessity for separate bearing pins and retaining devices therefor. Each link consists of but two parts, the rail member A and the shoe C, held together by the bolts D, and the removal of said bolts permits the immediate disassembling of the chain for replacement or repair of its parts.

I claim:

1. A tractor track-chain comprising a series of articulated members, each having a transverse portion terminating in oppositely disposed integrally formed bearing studs, said transverse portion having a lug raised from its under surface and divergent arms extending longitudinally from said transverse portion and provided at their outer end portions with hooks adapted to engage the bearing studs of the succeeding member to form a pivotal connection; and a tread shoe bolted to said arms, said shoe having a traction rib and a concave portion above said rib adapted to lie under the transverse portion of the succeeding member and to engage the raised lug thereof to retain the bearing studs of said portion in position within said hooks.

2. A tractor track-chain comprising a series of articulated members, each having a transverse portion terminating in oppositely disposed bearing studs, and divergent arms extending longitudinally from said transverse portion and provided at their outer end portions with hooks adapted to engage the bearing studs of the succeeding member to form a pivotal connection; and a tread shoe removably secured to each of said members, said shoe having a concave portion adapted to lie under the transverse portion of the succeeding member to retain the bearing studs thereof in position within said hooks and an upwardly turned lip adapted to engage the ends of said hooks in inter-locking relation.

In testimony whereof I have signed my name to this specification in the presence of two subscribing witnesses.

FRANK MOON.

Witnesses:
WILLIAM F. BOOTH, Jr.,
D. B. RICHARDS.